United States Patent
Carlson et al.

Patent Number: 5,923,487
Date of Patent: Jul. 13, 1999

[54] INTEGRATED SHOCK SENSING DEVICE

[75] Inventors: Lance R. Carlson; Larry G. Hutsell, both of Longmont, Colo.; Paul Ray Tomlinson, Dallas, Tex.

[73] Assignee: Maxtor Corporation, Longmont, Colo.

[21] Appl. No.: 08/870,178

[22] Filed: Jun. 5, 1997

[51] Int. Cl.⁶ .................................................. G11B 15/04
[52] U.S. Cl. ................................ 360/60; 360/75; 369/54
[58] Field of Search ........................... 360/69, 75, 60; 369/54

[56] References Cited

U.S. PATENT DOCUMENTS

| | | | |
|---|---|---|---|
| 5,004,207 | 4/1991 | Ishikawa et al. | 248/632 |
| 5,126,895 | 6/1992 | Yasuda et al. | 360/77.07 |
| 5,227,929 | 7/1993 | Comerford | 360/75 |
| 5,235,472 | 8/1993 | Smith | 360/69 X |
| 5,333,138 | 7/1994 | Richards et al. | 371/7 |
| 5,389,850 | 2/1995 | Wilmer | 310/329 |
| 5,392,290 | 2/1995 | Brown et al. | 371/10.1 |
| 5,426,545 | 6/1995 | Sidman et al. | 360/78.09 |
| 5,491,394 | 2/1996 | Harwood et al. | 318/563 |
| 5,491,676 | 2/1996 | Yamaguchi et al. | 369/44.28 |
| 5,696,645 | 12/1997 | Laughlin | 360/69 X |
| 5,710,943 | 1/1998 | Burton et al. | 395/872 |
| 5,777,815 | 7/1998 | Kasiraj et al. | 360/75 |

FOREIGN PATENT DOCUMENTS

WO 94/11874  5/1994  WIPO .............................. G11B 19/04

*Primary Examiner*—Andrew L. Sniezek
*Attorney, Agent, or Firm*—Sheridan Ross P.C.

[57] ABSTRACT

A disk drive system comprising a shock sensing circuit is disclosed. The shock sensing circuit includes a shock evaluation circuit and threshold logic and firmware that is capable of evaluating the level of physical shocks to the disk drive system. The shock evaluation circuit is capable of comparing the level of a physical shock to threshold shock values. The threshold logic and firmware is capable of periodically resetting the threshold shock values to account for the change in operating conditions experienced by the disk drive system. When the shock sensing circuit determines that a physical shock is present, communication between the read/write transducer and the disk is interrupted to prevent corruption of data stored on the disk.

20 Claims, 3 Drawing Sheets

INTEGRATED SHOCK SENSING DEVICE

FIELD OF THE INVENTION

The present invention relates to an apparatus for evaluating physical shocks to a disk drive system. More particularly, the present invention relates to a device for comparing the level of a physical shock to threshold shock values that are periodically reset by the device corresponding to the changing operating conditions experienced by the disk drive system.

BACKGROUND OF THE INVENTION

Typically, a disk drive includes a stack of several data storage disks having concentric tracks capable of storing data. A number of read/write transducers, located on actuator arms, are used to communicate with each data storage disk. The disks are spun at a high rotational speed causing the transducers to float above the disks on a small cushion of air.

One concern with disk drive operation is the potentially detrimental effects on a read or write operation when the disk drive, or a computing unit in which the disk drive resides, is subjected to a physical shock. If the shock is large enough, transducer movement could be induced that causes information to be read from or written to the wrong track. As disk drives continue to become smaller, with reduced tolerances and higher information storage densities, the risk of significant problems from a physical shock increases. Also, as computers continue to become more portable, they will continue to be used in ever more severe environments, which will require more reliable disk drive operation under a variety of operating conditions.

One method proposed for addressing problems cause by physical shocks is to modify the mechanical structure of the disk drive to absorb the shock. For example, U.S. Pat. No. 5,004,207 discloses the use of shock absorbers on the disk drive support structure to dampen shocks or vibrations. Such a shock dampening approach may provide some relief for small physical shocks or vibrations, but is not adequate for the large physical shocks frequently encountered by portable computers, such as laptops.

Another proposed approach for addressing problems caused by physical shocks is through use of off-track detectors. For example, U.S. Pat. No. 5,126,859 discloses a disk drive in which a detector constantly monitors transducer movement. During normal operation, the transducer is positioned between predetermined limits on the track. If the transducer moves off a predetermined track, the read or write operation is suspended and data is either re-written or re-read after the transducer has been re-positioned to the correct track. The effectiveness of off-track detectors is limited by the often significant time required for the system to respond to a physical shock. The response time is often not sufficiently fast to protect a read or write error, especially for relatively large shocks.

Another proposed approach to addressing problems caused by physical shocks, is to use a shock sensing device. For example, U.S. Pat. No. 5,491,394 discloses the use of an EMF coil that generates a voltage signal when a magnet, responding to a physical shock, is moved across the coil. Also, U.S. Pat. No. 5,227,929 discloses use of an accelerometer to detect a physical shock, such as when the disk drive is dropped or otherwise moved. Both these shock detection units typically produce an output signal that is compared to a threshold value. When the output signal from the sensor is greater than the threshold, the operation of the disk drive is halted.

One problem with these shock detecting systems is that the circuitry often contains significant background noise that can interfere with proper comparison of the output signal with the threshold. This problem is even more acute for computers, such as laptops, used in portable applications. This problem occurs because background signals in the circuit can vary considerably with changes in ambient operating conditions, and especially with changes in temperature. In some instances, the background noise may become so large that the noise distorts the output signal to such a large degree that the comparison of the output signal with the threshold value becomes unreliable as an accurate indicator of whether a shock is of significant size to warrant interruption of a read or write operation.

There is a significant need for improved methods for addressing operating problems that can occur in disk drives due to physical shocks as computers continue to be subjected to more severe and highly variable ambient operating conditions. This need is intensified as computers become smaller and more portable. More particularly, this need is intensified as information storage densities and track densities within disk drives increase causing the tracks to be spaced closer together. As such, it becomes critically important to accurately control movement of the transducer relative to the tracks.

SUMMARY OF THE INVENTION

In one aspect of the present invention, a disk drive system is provided that has the flexibility to account for the changing condition under which the disk drive system is operating. In this regard, the disk drive system incorporates a shock evaluator that evaluates physical shocks to the disk drive system to determine whether the shock is of sufficient magnitude to warrant prevention of communication with the disk. The shock evaluator includes circuitry capable of evaluating a signal that corresponds to a sensed physical shock by comparing the signal to threshold values that are periodically automatically reset to compensate for changes in ambient operating conditions to which the disk drive is subjected. In this manner, the disk drive can operate under a variety of operating conditions, such as at high or low temperatures, while reliably evaluating the severity of shocks to which the disk drive may be subjected. The present invention is, therefore, particularly suited for use in portable drives, such as laptop computers, that must satisfactorily operate under a wide variety of operation conditions. In one embodiment, the shock sensor of the present invention includes threshold firmware and logic that periodically automatically resets the threshold values to an appropriate level of sensitivity corresponding to the changing operating conditions experienced by the disk drive system.

In a preferred embodiment, the shock evaluator compares the input signal to upper and lower threshold levels for identification of a possible physical shock. The upper and lower threshold levels are periodically automatically reset by the threshold firmware and logic to account for the changing operating conditions. During setting of the threshold values, the upper threshold level is set to the maximum value and incrementally decreased until the shock detection circuit falsely determines that a shock has been detected when, in fact, no physical shock is present. Similarly, the lower threshold level is set to the lowest value and incrementally increased until the shock detection circuit falsely determines that a shock has been detected when, in fact, no physical shock is present. During the resetting operation, the upper and lower threshold levels at which a shock was falsely determined to exist represent background noise levels. With knowledge of these background noise levels as a basis, the threshold firmware and logic is capable of setting the upper and lower threshold levels to an appropriate sensitivity for actual shock determination that is required for satisfactory operation of the disk drive system under the ambient conditions to which the disk drive system is being subjected.

In another aspect of the present invention, the shock evaluator, including both the evaluation circuitry and the threshold logic and firmware, is capable of being integrated on a single semiconductor chip. In this regard, the evaluation circuitry incorporates a level shifting circuit that is capable of coupling a shock sensor amplifier to a window threshold detection circuit without the use of an AC coupling capacitor. The removal of the AC coupling capacitor allows the shock sensing device to be integrated on a single semiconductor chip, and, therefore, conserve precious space within the disk drive system.

DETAILED DESCRIPTION

The present invention provides a disk drive having shock evaluation capability for determining when a physical shock warrants prevention of a read or write communication with a disk. The shock evaluator automatically sets and periodically resets one or more threshold levels, and periodically resets, to which a signal, representative of a detected physical shock, is compared for determining whether communication is to be prevented. The automatic setting and resetting of a threshold level accommodates variations in background signals caused by electronic noise and voltage errors that change as the ambient operating conditions, particularly ambient temperatures and electromagnetic noise, vary. Enhanced reliability of shock evaluation is, therefore, provided because the threshold level against which a signal is compared, reflects the actual conditions under which the disk drive is being operated.

Figure 1:
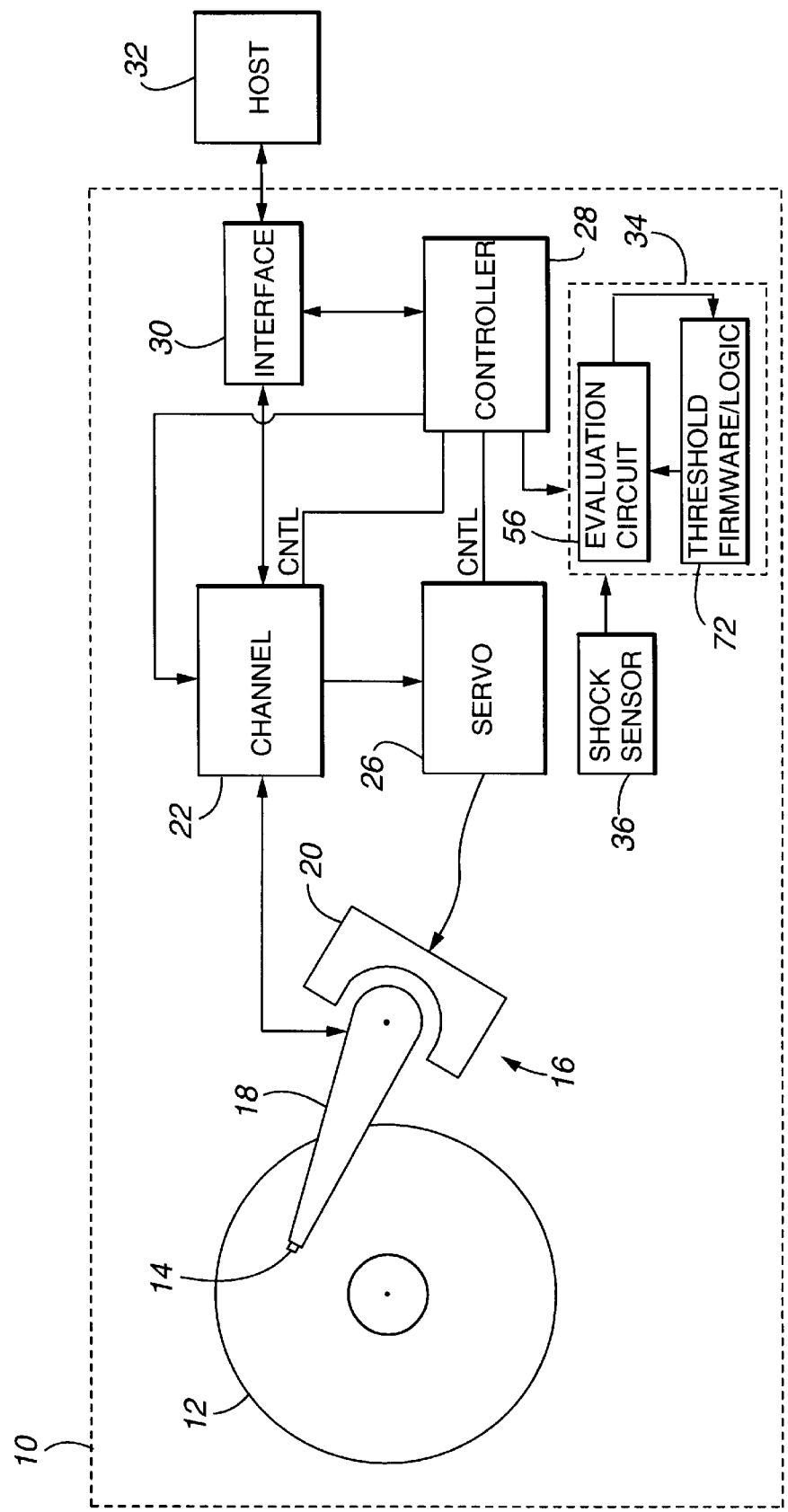
FIG. 1 is a block diagram showing one embodiment of a disk drive system of the present invention.

Referring to FIG. 1, a simplified electrical component block diagram of a disk drive system 10 is shown. The disk drive system 10 includes a disk 12; a communication device 14; and an actuator assembly 16, including an actuator arm 18 and a motor 20, such as a voice coil motor. The disk drive system 10 also includes a channel 22, a servo control unit 26, a controller unit 28, a shock evaluator 34, a shock sensor 36 and an interface 30. The shock evaluator 34 includes a shock evaluation circuit 56 and a self calibration unit 72, which are described more fully below with reference to FIGS. 2 and 3.

During operation of the disk drive system 10, the disk 12 rotates. Data is stored on the disk 12 in substantially concentric tracks. Data may be read from or written to the disk 12 by moving the communication device 14 to the desired track and performing the desired communication operation, i.e., a read or write operation. In one embodiment, the disk 12 is a magnetic disk having concentric read/write tracks and the communication device 14 is a magnetic transducer that is capable of communicating with the magnetic disk.

The actuator assembly 16, including the actuator arm 18 and the motor 20, receives servo control information from the servo control unit 26 to cause the motor to move the actuator arm 18 and, consequently, the communication device 14 when repositioning of the communication device 14 is required. In this regard, the communication device 14 may periodically read positioning information from the surface of the disk 12 and transmit the positioning information to the servo control unit 26 via the channel 22. The servo control unit 26 compares the present position of the communication device 14 to a desired position, with movement of the actuator arm 18 as required for proper track alignment.

The channel 22, receives a number of inputs for processing so that data may be manipulated by other devices internal and external, such as a host computer 32 interconnected with the interface 30, to the disk drive system 10. One operation of the channel 22 is to receive an analog read signal from the communication device 14 and to convert the analog signal to a digital signal recognized by the host computer 32. In addition, the channel 22 facilitates the storage of information from the host computer 32 to the disk 12 by encoding data signals from the host computer 32 and creating a write signal, from the encoded data, which is transmitted to the communication device 14 for storage on the disk 12.

The controller 28 controls the timing and operation of the other elements of the disk drive system 10. The controller unit 28 receives input/output requests from the host computer 32 via the interface unit 30. In addition, the controller 28 may receive information from the shock evaluator 34. Based on input to the controller 28, the controller 28 delivers the appropriate commands to the servo unit 26 and the channel 22. For example, in a read operation, the controller 28 commands the servo unit 26 to move the communication device 14 to the desired track on the disk 12 so that the data written on the disk 12 may be transferred to the host computer 32. Accordingly, the servo unit 26 moves the communication device 14 to the desired track using the servo positioning information read from the disk 12 by the communication device 14. In turn, the communication device 14 reads the information from the disk 12 and transmits the information to the channel 22 which converts the information such that it may be interpreted by the host computer 32.

The shock evaluator 34 works in cooperation with the controller 28 to prevent data loss or corruption when the disk drive system 10 is subjected to a large physical shock. In operation, the shock evaluator 34 receives a signal from a shock sensor 36 corresponding to the magnitude of a shock that has been detected by the shock sensor 36. The shock evaluator 34 compares the signal that corresponds to the physical shock with at least one, but preferably two threshold levels. In the case of a single threshold level, the absolute value of the signal representative of a shock is taken and compared to the single threshold level. In the case of two threshold levels, an upper threshold level and a lower threshold level are provided. The upper and lower thresholds represent acceleration levels that may be experienced by the disk drive. For example, the upper threshold hold level may represent an acceleration level that may correspond to movement in a first direction. Similarly, the lower threshold level may represent an acceleration that may correspond to movement in a second direction which opposite from the first direction. If the shock signal is above the upper threshold level or below the lower threshold level, the shock evaluator sends an interrupt signal to the controller 28 which, in turn, prevents communication between the disk 12 and the communication device 14 via the channel 22. Such prevention would prevent initiation of a communication or continuance of a communication in progress as the case may be.

Figure 2:
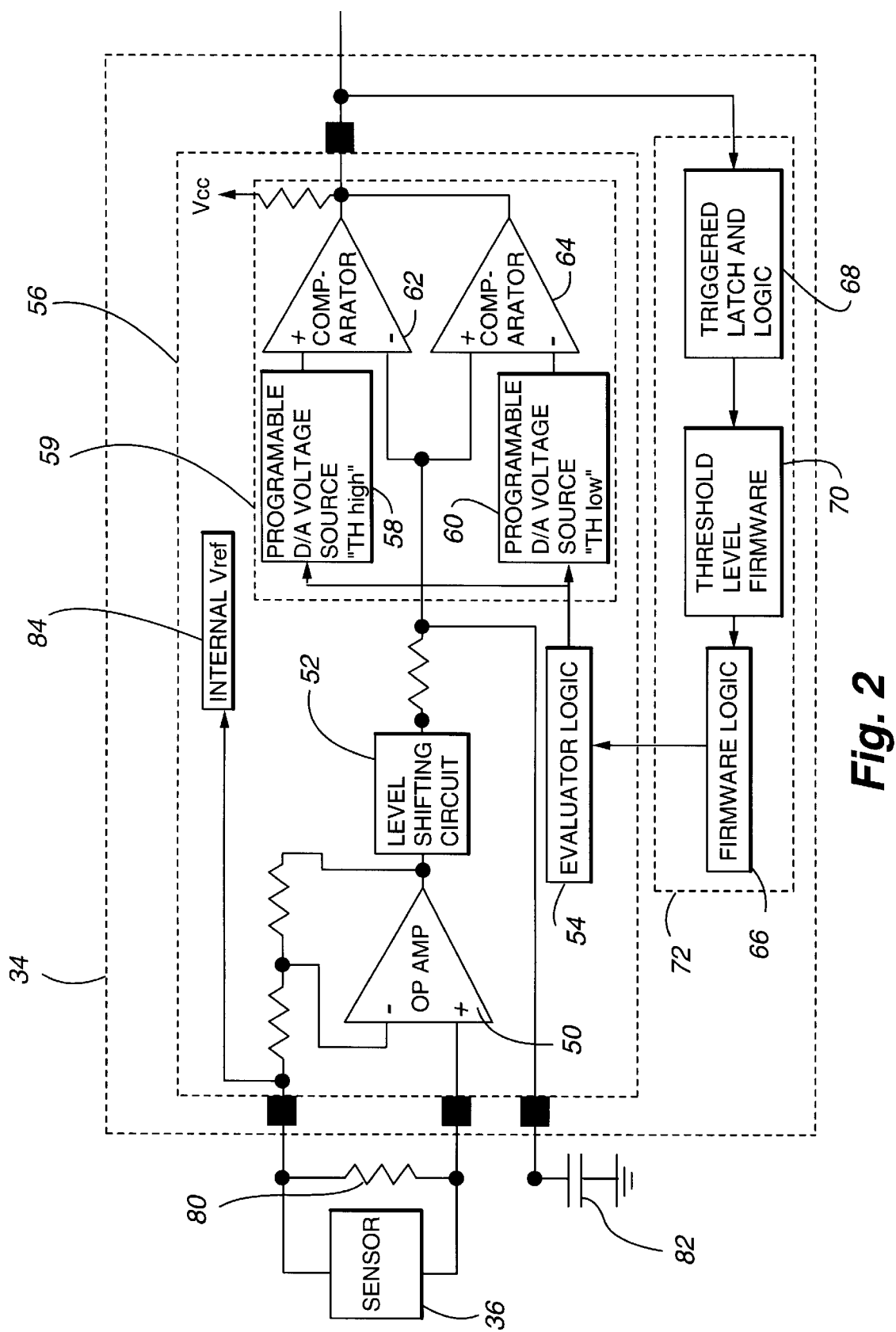
FIG. 2 is a block diagram showing one embodiment of a shock evaluator used with a disk drive system of the present invention.

Referring to FIG. 2, a block diagram of one embodiment of the shock evaluator 34 is shown including a shock evaluation circuit 56 and a self calibration unit 72. As shown in FIG. 2, the shock evaluation circuit 56 includes an operational amplifier 50, a level shifting circuit 52, a THhigh programmable digital to analog voltage source 58, a THlow programmable digital to analog voltage source 60, a first comparator 62, a second comparator 64 and evaluator logic 54. The self calibration unit 72 includes triggered latch and logic 68, threshold level firmware 70 and firmware logic 66. One advantage of the present invention is that the shock evaluation circuit 56 may be formed on an integrated circuit chip while the self calibration unit 72 is implemented in firmware. As such, this configuration of these device occupies a smaller area in the disk drive system 10 when compared to other shock sensing devices. Therefore, such a system saves precious space within a disk drive as disk drive systems become smaller. In this regard, it should be noted that the devices not capable of being integrated into the circuit due to their size are shock sensor 36, bias resistor 80 and filtering capacitor 82. As such, the present invention has efficiently minimized the use of external components to the shock evaluator 34.

With continued reference to FIG. 2, operation of the shock evaluation circuit 56 will be described for evaluation of a signal from the shock sensor 36 that corresponds to a detected physical shock. The signal from the shock sensor 36 is amplified by the operational amplifier 50 and the amplified signal is transmitted to a window threshold detection circuit 59 via a level shifting circuit 52. The shock sensor 36 may be any device which is capable of transmitting a voltage signal proportional to a physical shock. In a preferred embodiment, the shock sensor comprises an accelerometer such as a piezoelectric transducer. The accelerometer may be single axis sensor or a multiple axis sensor. A single axis sensor is capable of sensing movement along a single axis. A multiple axis sensor is capable of sensing, for example, three dimensional movement that can represent movement in a first and second linear direction and rotational movement. The shock sensor 36 may be located within the disk drive system 10 as shown in FIG. 1, or external to the disk drive system 10. A bias resistor 80 may be externally located from the shock evaluator 34 and across the terminals of the shock sensor 36. The bias resistor 80 provides a shunt path for the leakage current that may be present across the terminals of the operational amplifier 50. It is critical to minimize a voltage build up in the shock sensor 36 caused by the leakage current so that the shock evaluation circuit 56 does not sense a false shock. The voltage signal proportional to the magnitude of a physical shock is, typically, a small analog voltage on the order of 20 mV or less at the desired detection level. Due to the low voltage signal output from the shock sensor 36, the signal is amplified by an operational amplifier 50. In a preferred embodiment, the operational amplifier comprises a CMOS operational amplifier, and the amplifier should be capable of amplifying the analog voltage signal by 15 to 20 times the original signal strength.

After the signal for the shock sensor 36 has been amplified by the operational amplifier 50, the amplified signal goes to a level shifting circuit 52, which converts the analog voltage output from the operational amplifier 50 to a voltage signal that is recognizable by the first and second comparators, 62 and 64. It should be noted that the level shifting circuit 52 operates in conjunction with the internal voltage reference 84 to optimize the operation of the programmable D/A voltage sources 58 and 60 in a particular voltage range. The level shifting circuit 52 decouples the programmable D/A voltage sources from the operational amplifier 50 and allows the detection limits of the programmable D/A voltage sources 58 and 60 to operate in a lower voltage range (e.g., a smaller detection window), thus increasing the resolution and sensitivity of the window threshold detection circuit 59. Also, the shock evaluation unit 56 is capable of operating without the level shifting circuit 52. In such operation without the level shifting circuit 52, the programmable D/A voltage sources 58 and 60 must operate at a higher voltage range (e.g., a larger detection window), thus decreasing the resolution and sensitivity of the window detection circuit 59.

The signal from the level shifting circuit 52 is transmitted to the window threshold detection circuit 59 for comparison to the upper and lower threshold level. As the signal is being transmitted from the level shifting circuit 52 to the window threshold detection circuit 59, a filtering capacitor 82 operates as a low pass filter and filters out high frequency noise in the signal from the shock sensor 36 or the shock evaluator unit 56. Being located external to the shock evaluator 34, filtering capacitor 82 may be selected by the user depending on the particular cut-off frequency that is required for operation. When the voltage signal from the level shifting circuit 52 becomes greater than upper threshold level or lower than the lower threshold level the first or second comparator 62 or 64, transmits a "shock detect" signal to the self-calibration unit 72 and the controller 28, in FIG. 1.

The window threshold detection circuit 59 includes first comparator 62, second comparator 64 and programmable D/A voltage sources 58 and 60. In the window threshold detection circuit 59, the amplified signal is compared to upper and lower threshold levels which are automatically set, and periodically automatically reset, by the self-calibration unit 72 and the THhigh and THlow programmable D/A voltage sources, 58 and 60 respectively. When the amplified signal from the shock sensor 36 falls out of the preset threshold level range (i.e., above the upper threshold level of the first comparator 12 or below the lower threshold level of the second comparator 64), the shock evaluation unit 56 provides a digital "shock detect" output signal. The digital "shock detect" signal can be transmitted to the self-calibration unit 72 and the controller 28, as shown in FIG. 1.

The self-calibration unit 72 periodically automatically recalculates and resets the upper and lower threshold levels to account for changes in the operating conditions to which the disk drive system 10 is subjected. The calculation of the upper and lower threshold levels takes into account DC offset voltage errors in the first and second comparators, 62 and 64, the operational amplifier 50 and the level shifting circuit 52. In addition, the calculation of the upper and lower threshold levels takes into account electronic noise in the shock evaluator 34 and any electronic noise that may be generated externally from the shock evaluator 34, such as noise picked up from the shock sensor 36 and noise generated from the other devices within the computer system itself. For example, as computer systems become increasingly smaller, the disk drive unit may be placed adjacent to or on top of devices that generate electronic noise. As such, the electronic noise that is generated internally and externally to the shock evaluator 34 may be taken into account when the upper and lower thresholds are calculated. The firmware implementing the calculation of the upper and lower threshold levels may be located within the controller 28, within the shock evaluator 34, as shown in FIG. 1, or at any other convenient location.

Upon start up of the disk drive system 10, as shown in FIG. 1, the upper and lower threshold levels are set by the self-calibration unit 72. In setting the upper and lower threshold levels, the self-calibration unit 72 calibrates the threshold level using threshold level firmware 70. The calibrated threshold level is transmitted to the evaluator logic unit 54 that determines whether the threshold level is upper threshold level or the lower threshold level by evaluating another signal from the firmware logic unit 66. Once the evaluator logic unit 54 receives the upper threshold level, the evaluator logic unit 54 transmits the signal to the THhigh programmable digital to analog voltage source 58. The THhigh voltage source 58 converts the upper threshold level to an analog voltage which is compared to the amplified signal from the level shifting circuit 52. In the event that the evaluator logic unit 54 receives the lower threshold level, the evaluator logic unit 54 transmits the signal to the THlow programmable digital to analog voltage source 60. The THlow voltage source 60 converts the lower threshold level to an analog voltage which is compared to the amplified signal from the level shifting circuit 52.

The THhigh and the THlow voltage sources, 58 and 60, store and output their respective upper threshold and lower threshold until the threshold level firmware 70 resets the threshold levels. The threshold levels are periodically recalculated by the self-calibration unit 72 so that the threshold levels will take into account thermal drift of DC offset voltages in the first and second comparators, 62 and 64, the DC offset voltages of the operational amplifier 50 and the level shifting circuit 52 and electronic AC noise within the shock sensing device 34. In addition, the THhigh and THlow voltage sources allow integration of the shock sensing device 34 because the need for an AC coupling capacitor between the operational amplifier 50 and the first and second comparators, 62 and 64, is eliminated. Prior art devices include many external components, such as the AC coupling capacitor, that can not be integrated on a single semiconductor chip. In the present invention, the elimination of the AC coupling capacitor allows the shock evaluator 34 to be integrated on a single semiconductor chip with a minimum number of external components and, therefore, save scarce space within the disk drive system 10.

As explained earlier, an important aspect of the present invention includes the programmed automatic resetting of the upper and lower threshold levels to account for changes in DC offset voltages present in the comparators, the operational amplifier, the level shifting circuit and electronic AC noise inherent in the shock evaluator 34 as operating conditions to which the disk drive system 10 is subjected to changes. By including these errors in the threshold levels, the present invention reduces any false shock sensing by the shock sensing device 34. By periodically resetting the threshold levels to account for operational changes, reliable shock evaluation is possible even with varying ambient operating conditions.

Figure 3:
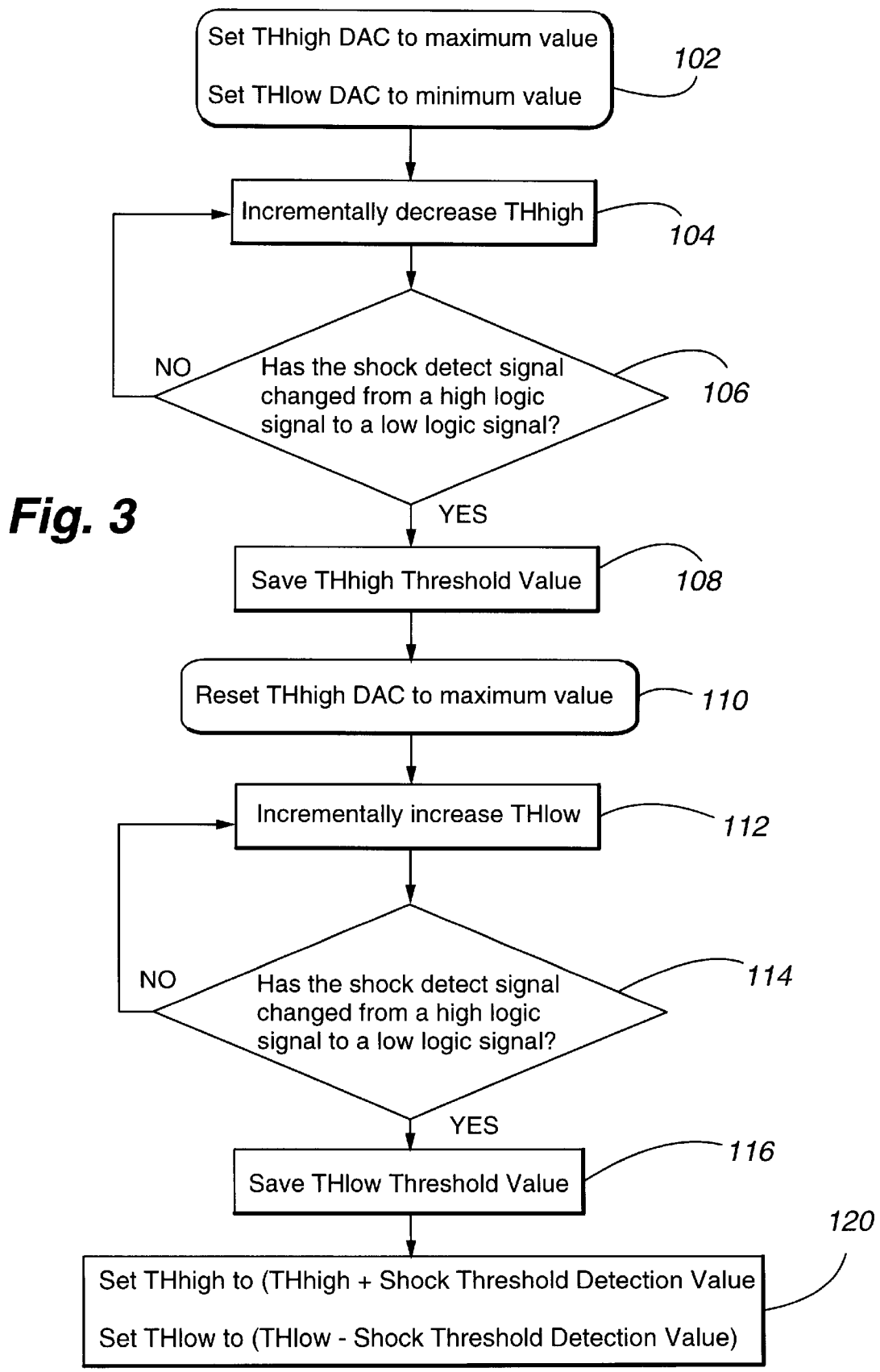
FIG. 3 is a flow diagram of one embodiment the firmware for determining threshold comparison levels for use in the shock evaluator of the disk drive system of the present invention.

To set or reset the upper and lower threshold levels, the self calibration unit 72 implements an algorithm, as shown in the flow chart of FIG. 3. When the shock evaluating circuit 56 resets the upper and lower threshold values, the triggered latch and logic unit 68 is instructed to receive the "shock detect" signal when it is transmitted from the shock evaluation circuit 56.

The threshold level firmware 70, via the firmware logic 66, sets the THhigh programmable digital to analog voltage source 58 to its maximum value and the THlow programmable digital to analog voltage source 60 to its minimum value (Step 102 in FIG. 3). By setting THhigh and THlow to these maximum and minimum values, the detection window is set to the wide open position. The threshold level firmware 70, in step 104, incrementally decreases the THhigh by a predetermined amount. With each incremental decrease of THhigh, the triggered latch and logic 68 determines when the output from the shock evaluation circuit 56 changes from a high logic value to a low logic value, step 106 in FIG. 3. When the shock evaluation circuit 56 outputs a low logic value, the THhigh value is saved by the threshold level firmware 70, step 108 in FIG. 3. This THhigh value corresponds to an upper level of electronic noise and error in the circuit.

Next, the THhigh value is reset by the threshold level firmware 70 to its maximum value to re-open the detection window, as shown in step 110 of FIG. 3. At this point, the threshold level firmware 70 incrementally increases THlow by a predetermined amount, as shown in step 112 of FIG. 3. Again, the triggered latch and logic 68 determines when the output from the shock evaluator changes from a high logic signal to a low logic signal, step 114 of FIG. 3. The threshold level firmware 70 saves the THlow value when a low logic signal is detected, step 116 of FIG. 3. Thus THhigh and THlow values are saved at which the "shock-detect" signal changes from a high logic signal to a low logic signal, even through the disk drive system 10 has not been subjected to physical shock. These saved values reflect the threshold levels, at which the shock evaluator 34 would determine that a shock has been encountered, even when the disk drive system 10 is in a static state, and has not been subjected to a physical shock.

As stated previously, the THhigh and THlow values include the threshold errors inherent in the circuit devices and the electronic noise generated from the circuit and externally from the circuit. By incrementing to find the upper and lower threshold levels at which a "shock-detect" signal is generated when no actual physical shock has occurred, the algorithm in the firmware includes the error and noise in the THhigh and THlow values. Theoretically, the threshold values would increment to zero before a shock detection signal is detected, but background signals due to DC offset errors and electronic noise may cause the false determination that a shock has occurred. Therefore, the deviations which occur in the threshold level are the DC offset errors and electronic noise. As such, once these error and noise values are known, the desired detection threshold can be incremented by these error/noise values to eliminate false triggering of the shock evaluator 34.

Again, referring to FIG. 3, once the saved THhigh and THlow threshold values are known, the desired shock level threshold value is added to the Thhigh and subtracted from the THlow values to obtain the upper threshold level and the lower threshold level, as in step 120 in FIG. 3. Generally, the shock level threshold values can be obtained from the shock level rating assigned to the disk drive by the manufacturer. The shock level rating is measured in gravities (Gs) corresponding to a magnitude of a shock that could cause data to be lost or written incorrectly on the magnetic disk of the disk drive system. Typically, the rated G value corresponds to a voltage, for example, 1G=20 mV (output from the operational amplifier 50 in FIG. 2). Therefore, once the shock level rating has been determined and programmed in the firmware 70, the upper and lower thresholds may be calculated.

For example, a disk drive system may have a shock level rating of 5G or 100 mV. During a reset of the upper and lower threshold levels for detection, the threshold level firmware may determine that THhigh=120 mV and THlow=125 mV. Given these values, the upper threshold level will be set at THhigh+5G=120 mV+100 mV=220 mV, and the lower threshold level will be set at THlow−5G=125 mV−100 mV=25 mV. These upper and lower threshold values created the threshold detection window. When the magnitude of a physical shock from the shock sensor is greater than 220 mV or less than 25 mV, the shock evaluator will make the "shock detect" signal true (logical low value). This signal will be sent to the controller that will send a signal to the channel to prevent communication between the communication device and the disk. Operation in this manner prevents data from being lost or corrupted by a physical shock to the system.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A disk drive comprising:
a data storage disk capable of storing data;
a communication device capable of communicating with said data storage disk, said communicating including at least one of reading data from said data storage disk and writing data to said data storage disk;
a shock evaluator capable of receiving a first signal corresponding to a sensed physical shock and electronically processing said first signal to determine whether communication between said data storage disk and said communication device should be prevented, said shock evaluator capable of transmitting a second signal to prevent said communication when said shock evaluator determines that said physical shock is sufficiently large;
wherein said processing of said first signal includes comparing said first signal to a reference, said reference, when said disk drive is in operation, automatically adjusting to compensate for changes in ambient conditions to which the disk drive is subjected.

2. A disk drive, as claimed in claim 1, wherein:
said disk comprises a magnetic storage medium.

3. A disk drive, as claimed in claim 1, wherein:
said disk comprises a removable floppy disk.

4. A disk drive, as claimed in claim 1, wherein:
said disk comprises an optical storage medium.

5. A disk drive, as claimed in claim 1, wherein:
said first signal comprises a voltage signal having a voltage that is proportional to the magnitude of a physical shock sensed by a shock sensor.

6. A disk drive, as claimed in claim 5, wherein:
said shock sensor comprises an accelerometer.

7. A disk drive, as claimed in claim 1, wherein:
said reference automatically adjusts to compensate for background contribution in said first signal, said background contribution being from electronic noise and electronic error internal and external to said shock evaluator, the magnitude of said background contribution varying with changes in at least one of operating temperature of said shock evaluator and electronic noise internal and external to said shock evaluator.

8. A disk drive, as claimed in claim 7, wherein:
said background level corresponding to a background voltage signal; and
said reference automatically adjusting to determine said background voltage signal by setting said reference to an initial level and incrementing said reference until said shock evaluator indicates that a physical shock has occurred even when no physical shock has occurred.

9. A disk drive, as claimed in claim 1, wherein:
said reference comprises an upper threshold and a lower threshold, said shock evaluator capable of comparing said first signal to each of said upper threshold and said lower threshold; and
communication between said communication device and said disk being prevented when said first signal is larger than said upper threshold or when said first signal is smaller than said lower threshold.

10. A disk drive, as claimed in claim 9, wherein:
said upper threshold and said lower threshold each automatically adjust to accommodate background contribution from electronic noise and electronic error internal and external to said shock evaluator, which background contribution varies with changes in at least one of the operating temperature of said shock evaluator and electronic noise internal and external to said shock evaluator.

11. A disk drive, as claimed in claim 10, wherein:
said background contribution comprises a first background voltage and a second background voltage;
said upper threshold automatically adjusting to determine said first background voltage by setting said upper threshold to an initial level and incrementally decreasing said upper threshold to said first background level where said shock evaluator indicates that a physical shock has occurred even when no physical shock has occurred; and
said lower threshold automatically adjusting to determine said second background voltage by setting said lower threshold to an initial level and incrementally increasing said lower threshold to said second background level where said shock evaluator indicates that a physical shock has occurred even when no physical shock has occurred.

12. The disk drive as claimed in claim 1, wherein:
when said disk drive is operational, said reference periodically automatically resets to compensate for changes in at least one of operating temperature of said shock sensor and changes in electronic noise internal and external to said shock sensor that may have occurred since an immediately preceding resetting of said reference.

13. The disk drive as claimed in claim 1, wherein:
when said disk drive is operational and in a substantially static state, said shock evaluator is subjected to a background signal that varies with at least one of the temperature at which said shock evaluator is operating and electronic noise internal and external to said shock sensor; and
during said automatically adjusting, said reference is reset to compensate for changes in said background signal.

14. The disk drive as claimed in claim 1, wherein:

when said disk drive is operational and in a substantially static state, said shock evaluator is subjected to a background signal;

said shock evaluator periodically automatically resetting said reference to include compensation for changes in said background signal that may have occurred since an immediately preceding reset of said reference.

15. The disk drive as claimed in claim 14, wherein:

said periodically automatically resetting said reference includes periodically automatically determining the level of said background signal.

16. The disk drive as claimed in claim 14, wherein:

said reference comprises an upper threshold to which said shock evaluator compares said first signal, said shock evaluator transmitting said second signal to prevent said communication when the level of said first signal exceeds said upper threshold;

said reference comprises a lower threshold to which said shock evaluator compares said first signal, said shock evaluator transmitting said second signal to prevent said communication when said lower threshold exceeds the level of said first signal;

said automatically periodically resetting of said reference includes automatically periodically determining an upper level of said background signal and a lower level of said background signal.

17. The disk drive as claimed in claim 16, wherein:

said automatically periodically resetting includes automatically resetting said upper threshold at a level that exceeds said upper level of said background signal and automatically resetting said lower threshold at a level that is exceeded by said lower level of said background signal.

18. The disk drive as claimed in claim 16, wherein:

said automatically periodically resetting includes resetting said upper threshold at a first increment higher than said upper threshold and resetting said lower threshold at a second increment lower than said lower threshold.

19. The disk drive as claimed in claim 18, wherein:

said first increment and said second increment are substantially equal.

20. The disk drive as claimed in claim 16, wherein:

said upper threshold corresponds to an upper voltage limit and said lower threshold corresponds to a lower voltage limit;

said first signal comprises a voltage signal, said shock evaluator transmitting said second signal to prevent said communication when said first signal, including said background signal, has a voltage at a level that larger than said upper voltage limit, or smaller than said second voltage limit.

* * * * *